US007001651B2

(12) United States Patent
Hayakawa et al.

(10) Patent No.: US 7,001,651 B2
(45) Date of Patent: Feb. 21, 2006

(54) HEAT-SHRINKABLE POLYESTER FILM

(75) Inventors: Satoshi Hayakawa, Inuyama (JP);
Norimi Tabota, Inuyama (JP);
Yoshinori Takegawa, Ohtsu (JP);
Katsuya Ito, Ohtsu (JP); Shigeru Komeda, Osaka (JP); Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/491,145

(22) PCT Filed: Jul. 9, 2002

(86) PCT No.: PCT/JP02/06944

§ 371 (c)(1),
(2), (4) Date: Mar. 26, 2004

(87) PCT Pub. No.: WO03/031504

PCT Pub. Date: Apr. 17, 2003

(65) Prior Publication Data

US 2004/0241470 A1   Dec. 2, 2004

(30) Foreign Application Priority Data

Sep. 26, 2001 (JP) ............... 2001-293731

(51) Int. Cl.
*B32B 7/00* (2006.01)
*C08G 63/52* (2006.01)

(52) U.S. Cl. ............. 428/34.9; 528/302; 528/307; 528/308; 528/308.6; 428/34.9; 428/35.1

(58) Field of Classification Search ........... 528/302, 528/307, 308, 308.6; 428/357, 34.9, 35.1
See application file for complete search history.

(56) References Cited

U.S. PATENT DOCUMENTS 6,599,994 B1 * 7/2003 Shelby et al. ............. 525/444

FOREIGN PATENT DOCUMENTS

| EP | 271928 A2 | 6/1988 |
| JP | 57-212228 A | 12/1982 |
| JP | 59-97175 A | 6/1984 |
| JP | 4-193526 A | 7/1992 |
| JP | 7-32478 A | 2/1995 |
| JP | 7-53737 A | 2/1995 |
| JP | 7-53756 A | 2/1995 |

OTHER PUBLICATIONS

International Search Report of PCT/JP02/06944, Nov. 5, 2002.
English Abstract of JP-4-193526 A, Jul. 13, 1992, Sekisui Chemical Co., Ltd.
English Abstract of JP 7-32478 A, Feb. 3, 1995, Toyobo Co., Ltd.
English Abstract of JP 7-53756 A, Feb. 28, 1995, Toyobo Co., Ltd.
English Abstract of EP 271928 A2, Jun. 22, 1988, Toyo Boseki Kabushiki Kaisha.
English Abstract of JP 7-53737 A, Feb. 28, 1995, Kanebo, Ltd.
English Abstract of JP 57-212228 A, Dec. 17, 1982, The Nippon Synthetic Chemical Industry Co., Ltd.

* cited by examiner

*Primary Examiner*—Samuel A. Acquah
(74) *Attorney, Agent, or Firm*—Kenyon & Kenyon

(57) ABSTRACT

Disclosed is a heat-shrinkable polyester film having a specific composition. A heat shrinkage factor of a 10 cm square sample of the film in a maximal shrinkage direction of the film is not less than 20% under the condition that the sample is immersed in hot water of 85° C. for 10 seconds, and then in water of 25° C. for 10 seconds. The number of test pieces of the film having a rupture ratio of not more than 5% is not more than 10% to the total number of the test pieces under the condition that a tensile test of drawing the film in a direction orthogonal to the maximal shrinkage direction of the film is conducted with a distance between corresponding chucks of 100 mm, each test piece having 15 mm in width, a temperature of 23° C., and a drawing rate of 200 mm/min.

4 Claims, No Drawings

HEAT-SHRINKABLE POLYESTER FILM

This is a 371 application of PCT/JP02/06944 filed 9 July 2002, which claims priority to JP 2001-293731 filed 26 Sep. 2001 and JP 2001-170046 filed 05 Jun. 2001, the contents of which are incorporated herein by reference in their entirety.

TECHNICAL FIELD

The present invention relates to heat-shrinkable polyester films, and more particularly to heat-shrinkable polyester films with less or no generation of defects such as whitening, shrinkage shading, crinkling, distortion, or uneven shrinkage in a direction orthogonal to the maximum shrinkage direction.

BACKGROUND ART

Heat-shrinkable plastic films are widely used for production of heat-shrinkable packages, heat-shrinkable labels, and the like by utilizing the heat-shrinking property thereof. Among such films, drawn films such as polyvinyl chloride film, polystyrene film, and polyester film are used for production of labels, cap seals, or refuse (garbage) packages in various kinds of containers such as polyethylene terephthalate (PET) containers, polyethylene containers, and glass containers.

However, polyvinyl chloride films have low heat resistance, and likely to emit hydrogen chloride gas at the time of incineration, thereby emitting dioxin. Further, in use of heat-shrinkable vinyl chloride resinous film as shrinkable labels on PET containers or the like, the labels and the containers are required to be separated from each other in recycling of the containers.

Polystyrene films are preferable in the aspect of good finishing appearance after shrinkage. However, since they have low resistance to a solvent, it is required to use an ink having a special composition in printing. Further, polystyrene resin is required to be incinerated at a high temperature, and a large amount of black smoke and nasty odor are likely to be generated at the time of incineration.

There is a great expectation for polyester films free of such problems as substitute shrinkable labels for polyvinyl chloride films and polystyrene films. As consumption of PET containers is increased, there is a tendency that consumption of polyester films is increased.

Despite of the above merits, there is a demand for further improvement in the conventional heat-shrinkable polyester films in the aspect of shrinking property. Particularly, characters or patterns that have been printed on films before shrinkage are likely to be distorted at the time of attaching the films to containers such as PET bottles, polyethylene bottles, and glass bottles by heat shrinkage owing to generation of shrinkage shading, or crinkling. Accordingly, there is a demand from users of reducing such distortion.

Compared with heat-shrinkable polystyrene films, polyester films have poor shrinkage at a low temperature. In view of this, it is required to shrink polyester films at a high temperature to obtain a required shrinkage, which may likely to cause deformation of bottle bodies and whitening of bottles.

In attaching heat-shrinkable films to containers by heat shrinkage, the films are shaped into various shapes such as labels and bags after a printing step, if necessary. After placing of the label-like films or the bag-like films onto the containers, the films are tightly attached to the containers by heat shrinkage while the containers are conveyed on a belt conveyor or the like through a shrinking tunnel (steam tunnel) wherein heated steam is blown in for heat shrinkage or a shrinking tunnel (hot-air tunnel) wherein hot air is blown in for heat shrinkage.

A steam tunnel provides higher heat transfer efficiency than a hot-air tunnel and makes it possible to perform more uniform heat shrinkage. Compared with a hot-air tunnel, a steam tunnel provides superior finishing appearance after heat shrinkage. However, compared with polyvinyl chloride films and polystyrene films, the conventional heat-shrinkable polyester films are poor in shrink finishing appearance after being conveyed through the steam tunnel.

Further, in use of a hot-air tunnel in which temperature spots are likely to appear during heat shrinkage, whitening, shrinkage shading, crinkling, distortion or a like drawback is likely to appear on the conventional polyester films. Particularly, whitening causes a serious deterioration in product appearance. The conventional polyester films are inferior to polyvinyl chloride films and polystyrene films in shrinkage finishing after being conveyed through a hot-air tunnel.

Furthermore, if drawing is increased in an attempt to secure a high shrinkage factor, the film is likely to be torn in a direction orthogonal to the shrinkage direction. Thereby, tear-related troubles of the film may likely to occur during a printing step, a label producing step, or after shrinkage. An improvement for such troubles has been demanded.

In view of the above, it is an object of the present invention to solve the problems residing in the conventional heat-shrinkable polyester films, and to provide heat-shrinkable polyester films suitable for production of labels which have an excellent shrinking property in a wide temperature zone from a low temperature to a high temperature, as well as excellent tear resistance, and solvent adhesiveness, and have no or less whitening, shrinkage shading, crinkling, distortion, uneven shrinkage in a direction orthogonal to the maximum shrinkage direction, or the like.

SUMMARY OF THE INVENTION

The inventive heat-shrinkable polyester film is produced by using polyester comprising 1,4-cyclohexane dimethanol of not less than 10% by mole, neopentyl glycol of not less than 2% by mole, based on a polyhydric alcohol component constituting the polyester, wherein the sum of the contents of the 1,4-cyclohexane dimethanol and the neopentyl glycol is in the range from 12 to 40% by mole, wherein a heat shrinkage factor of a 10 cm square sample of the film in a maximal shrinkage direction of the film is not less than 20% under the condition that the sample is immersed in hot water of 85° C. for 10 seconds, and then in water of 25° C. for 10 seconds.

Use of the polyester having a specific composition is advantageous in providing a heat-shrinkable polyester film which has an excellent shrinking property in a wide temperature zone from a low temperature to a high temperature, minimizes generation of whitening, shrinkage shading, crinkling, distortion, uneven shrinkage in a direction orthogonal to the maximal shrinkage direction, or a like drawback, and particularly eliminates whitening after being conveyed through a hot-air tunnel.

Further, preferably, the heat-shrinkable polyester film has a feature that the number of test pieces of the film having an elongation at break of not more than 5% is not more than 10% to the total number of the test pieces under the condition that a tensile test of drawing the film in a direction orthogonal to the maximal shrinkage direction of the film is conducted with a distance between corresponding chucks of 100 mm, each test piece having 15 mm in width, a temperature of 23° C., and a drawing rate of 200 mm/min. The film having such a property has excellent tear resistance, as will be described later.

More preferably, the present invention is directed to a heat-shrinkable polyester film substantially free of voids, in which the content of 1,4-cyclohexane dimethanol is not less than 10% by mole, and the content of neopentyl glycol is not less than 2% by mole, based on a polyhydric alcohol component constituting the polyester; the sum of the contents of the 1,4-cyclohexane dimethanol and the neopentyl glycol is in the range from 12 to 40% by mole; a dicarboxylic acid component constituting the polyester is an aromatic dicarboxylic acid other than isophthalic acid; and the content of ethylene terephthalate units is not less than 50% by mole, wherein a heat shrinkage factor of a 10 cm square sample of the film in a maximal shrinkage direction of the film is not less than 20% under the condition that the sample is immersed in hot water of 85° C. for 10 seconds, and then in water of 25° C. for 10 seconds; and the number of test pieces of the film having an elongation at break of not more than 5% is not more than 10% to the total number of the test pieces under the condition that a tensile test of drawing the film in a direction orthogonal to the maximal shrinkage direction of the film is conducted with a distance between corresponding chucks of 100 mm, each test piece having 15 mm in width, a temperature of 23° C., and a drawing rate of 200 mm/min.

It is recommended that the aromatic dicarboxylic acid is terephthalic acid.

Preferably, in the inventive heat-shrinkable polyester film, the polyhydric alcohol component may contain 1,4-butanediol of not less than 2% by mole. Thereby, the resultant film is provided with satisfactory finishing appearance after the shrinkage especially in a low temperature zone.

DETAILED DESCRIPTION

The inventive heat-shrinkable polyester film is produced by using polyester comprising a known carboxylic acid component, and a known polyhydric alcohol component. Preferably, the polyester comprises as raw materials, 1,4-cyclohexane dimethanol of not less than 10% by mole, neopentyl glycol of not less than 2% by mole, based on the polyhydric alcohol component constituting the polyester, and the sum of the contents of the 1,4-cyclohexane dimethanol and the neopentyl glycol is in the range from 12 to 40% by mole, and the content of ethylene terephthalate units is not less than 50% by mole, wherein the polyester does not contain isophthalic acids and aliphatic dicarboxylic acids as a dicarboxylic acid component.

It is desirable that the inventive heat-shrinkable polyester film is substantially free of voids. The expression "substantially free of voids" means that the film does not have positively created voids, except for unavoidably created voids during a film production step or the like, for example.

The inventive heat-shrinkable polyester film is required to have a heat shrinkage factor of not less than 20% in the maximal shrinkage direction of the film under the condition that a 10 cm square sample of the film is immersed in hot water of 85° C. for 10 seconds, and immediately immersed in water of 25° C. for 10 seconds. If the heat shrinkage factor is less than 20%, the film may not have sufficient heat shrinkability. As a result, if a film product having such a poor heat shrinkability is attached to a container or the like for heat shrinkage, the film product may not be fixedly attached to the container, and the resultant container may not have good appearance. Accordingly, a preferred heat shrinkage factor is 40% or more, more preferably 50% or more. An upper limit of the heat shrinkage factor is preferably 70%.

"The heat shrinkage factor in the maximal shrinkage direction" means a heat shrinkage percentage in a direction along which shrinkage of a film sample is largest. The maximal shrinkage direction is determined by the size of a square sample in lengthwise direction or widthwise direction (or oblique direction). The heat shrinkage factor (unit: %) is obtained by immersing a 10 cm square sample in hot water of 85° C.±0.5° C. under no load for 10 seconds to induce heat shrinkage, immediately followed by immersion in water of 25° C. ±0.5° C. under no load for 10 seconds, measuring the size of the sample in lengthwise and widthwise directions (or oblique direction), and implementing calculation according to the following equation:

heat shrinkage factor=100×(length before shrinkage−length after shrinkage)÷(length before shrinkage).

According to an aspect of the present invention, provided is a heat-shrinkable polyester film having excellent tear resistance. As a parameter for judging whether the film has desired tear resistance, it is preferable that the film satisfies the requirement that the number of test pieces of the film having an elongation at break of not more than 5% is not more than 10% to the total number of the test pieces under the condition that a tensile test of drawing the film in a direction orthogonal to the maximal shrinkage direction of the film before heat-shrinkage is conducted with a distance between corresponding chucks of 100 mm, each test piece having 15 mm in width, a temperature of 23° C., and a drawing rate of 200 mm/min. The tensile test is conducted according to JIS K 7127.

To satisfy the above requirement means that the number of the test pieces of the film which are torn before being drawn by 5% is 10% or less to the total number of the test pieces. The less the number of the test pieces having an elongation at break of 5% or less, the more preferred the film having such a result is. The film satisfying the above requirement has excellent tear resistance. Accordingly, loss of the film generated by film rupture in a printing or tubing step is reduced, and high speed production of film products is secured.

The conventional heat-shrinkable polyester film has such a property that the heat shrinkage factor is saturated, depending on the composition of the polyester constituting the film, when the film is heated and reaches a certain temperature in a heat shrinking step. As a result, further shrinkage is not expected by further heating. The film having such a property may be advantageous in that heat shrinking at a relatively low temperature is possible. However, it is highly likely that whitening may be generated on the film if the film is subjected to heat shrinkage in a hot-air tunnel or if the film is stored for a long term at an ambient temperature of 30° C. or higher before heat shrinkage. It is conceived that whitening results from a phenomenon that molecular chains of polyester are partially crystallized, and a refractive index of light at a crystallized portion is differentiated from a refractive index of light at a amorphous portion.

The inventors found that use of 1,4-cyclohexane dimethanol of not less than 10% by mole based on 100% by mole of a polyhydric alcohol component is effective in suppressing the whitening. The content of the 1,4-cyclohexane dimethanol is preferably 12% or more by mole, and more preferably, 14% or more by mole.

It is required that neopentyl glycol of not less than 2% by mole be contained based on 100% by mole of the polyhydric alcohol component in order to secure good shrinkage finishing in a low temperature zone. The content of the neopentyl glycol is preferably 4% or more by mole, and more preferably, 6% or more by mole.

Desirably, the inventive heat-shrinkable polyester film has ethylene terephthalate units, as a primary constitutional component of the polyester to provide the film with good tear resistance, mechanical strength, heat resistance, and the like, which will be described later in detail. The 1,4-cyclyhexanedimethanol and the neopentyl glycol are added to raise the degree of non-crystallinity by lowering crystallinity of the polyester so as to achieve a higher heat shrinkage factor. In view of this, it is desirable that the sum of the contents of the 1,4-cyclohexane dimethanol and the neopentyl glycol is 40% or less by mole, based on 100% by mole of the polyhydric alcohol component.

If the sum of the contents of the 1,4-cyclohexane dimethanol and the neopentyl glycol is in excess of 40% by mole, the shrinkage factor of the film may be undesirably increased, thereby causing positional displacement of a label or distortion of printed design of the label in a heat shrinking step. Further, the excessive use of these components may lower the solvent resistance of the film. As a result of the excessive use of the components, it is highly likely that whitening may occur in a printing step due to existence of the solvent of the ink, such as ethyl acetate, or tear resistance of the film may be lowered. In view of this, it is preferable that the sum of the contents of these components is 37% or less by mole, and more preferably, 35% or less by mole.

On the other hand, if the sum of the contents of the 1,4-cyclohexane dimethanol and the neopentyl glycol is less than 12% by mole, the number of ethylene terephthalate units is increased, thereby raising the degree of crystallinity of the polyester. As a result, heat shrinking may be insufficient, or whitening due to partial crystallization may occur. Also, the insufficient use of these components may undesirably raise the solvent resistance of the film. Thereby, adhesion failure may occur in an adhesion step of forming the film into a tube with use of a solvent such as tetrahydrofuran or 1,3-dioxolane. In view of this, the sum of the contents of the 1,4-cyclohexane dimethanol and the neopentyl glycol is 16% or more by mole, and more preferably, 20% or more by mole. It is preferred to use the 1,4-cyclohexane dimethanol in the quantity greater than the neopentyl glycol. This is because use of the 1,4-cyclohexane dimethanol in a greater quantity than the neopentyl glycol is more effective in suppressing generation of the whitening.

According to a further preferred aspect of the present invention, the polyester used in the present invention contains 1,4-butanediol as the polyhydric alcohol. Use of the 1,4-butanediol contributes to raising the degree of non-crystallinity by lowering crystallinity of the polyester so as to achieve a higher heat shrinkage factor. Thereby, the resultant film is provided with excellent shrinkage finishing in a relatively low temperature zone, as well as excellent solvent adhesiveness. In order to obtain these effects, it is preferred to use the 1,4-butanediol of not less than 2% by mole, based on 100% by mole of the polyhydric alcohol component. A preferred lower limit of the 1,4-butanediol is 3% by mole, and a further preferred lower limit is 5% by mole. An excessive use of the 1,4-butanediol may reduce the quantity of ethylene terephthalate units for controlling the properties of the film such as tear resistance, physical and chemical properties, and heat resistance. In view of this, the upper limit of the content of the 1,4-butanediol is 35% by mole, and more preferably, 30% by mole.

Examples of the polyhydric alcohol other than the above include ethylene glycol for forming ethylene terephthalate units. Alkylene glycols such as diethylene glycol, dimer diol, propylene glycol, triethylene glycol, 1,6-hexanediol, 3-methyl-1,5-pentanediol, 2-methyl-1,5-pentanediol, 2,2-diethyl-1,3-propanediol, 1,9-nonanediol, and 1,10-decanediol; alkylene oxide addition products of bisphenol compounds or derivatives thereof; trimethylol propane; glycerin; pentaerythritol; polyoxytetramethylene glycol; and polyethylene glycol may be added. Further, ε-caprolactone may partially be used to synthesize the polyester.

It is preferred to selectively produce the polyester, so that the content of the ethylene terephthalate units as constitutional units of the polyester film is not less than 50% by mole, considering tear resistance, mechanical properties, heat resistance, and the like of the film. In view of this, it is preferred to use terephthalic acid or its ester of not less than 50% by mole, based on 100% by mole of the polycarboxylic acid component, and ethylene glycol of not less than 50% by mole, based on 100% by mole of the polyhydric alcohol component. The content of the ethylene terephthalate units is preferably 55% or more by mole, and more preferably, 60% or more by mole. According to the present invention, since the sum of the contents of the 1,4-cyclohexane dimethanol and the neopentyl glycol is not less than 12% by mole, based on 100% by mole of the polyhydric alcohol component, the content of ethylene glycol is 88% or less by mole. Further, if 1,4-butanediol of 2% or more by mole is additionally used, the content of ethylene glycol is 86% or less by mole.

Aromatic dicarboxylic acids, esterified derivatives thereof, or the like are usable as the dicarboxylic acid component other than terephthalic acid. Examples of the aromatic dicarboxylic acids are naphthalene-1,4- or -2,6-dicarboxylic acid. Examples of the esterified derivatives are derivatives of dialkylester, diarylester, or the like. Further, oxycarboxylic acids such as p-oxybenzoate, and polycarboxylic acids such as trimellitic anhydride, and pyromellitic anhydride may be added, according to needs. Among these, naphthalene-1,4-, or -2,6-dicarboxylic acid is preferred.

Polyester constituting the inventive heat-shrinkable polyester film can be produced by melting polymerization according to a conventional method. Examples of the conventional method are a so-called direct polymerization in which dicarboxylic acids and glycols are directly reacted with each other, and the resultant oligomer is subjected to polycondensation, and a so-called trans-esterification in which dimethylesters of dicarboxylic acid and glycols are subjected to trans-esterification, followed by polycondensation. An arbitrary production method is applicable. Further, polyester produced by a polymerization method other than the above may be used. Preferably, the degree of polymerization of the polyester is in the range from 0.3 to 1.3 dl/g in intrinsic viscosity.

It is possible to add, to the polyester, a magnesium salt such as magnesium acetate, and magnesium chloride; a calcium salt such as calcium acetate, and calcium chloride; a manganese salt such as manganese acetate, and manganese chloride; a zinc salt such as zinc chloride, and zinc acetate; and a cobalt salt such as cobalt chloride, and cobalt acetate, each in the quantity of 300 ppm (in terms of mass, hereinafter, the unit is the same) or less in terms of metallic ions, as well as phosphoric acid, or phosphoric acid ester derivatives such as trimethyl phosphate, and triethyl phosphate in the quantity of 200 ppm or less in terms of phosphorous (P), in addition to a polymerization catalyst such as antimony oxide, germanium oxide, and a titanium compound, in order to avoid drawbacks such as coloring and gelation.

If the total quantity of the metallic ions other than the polymerization catalyst exceeds 300 ppm to the polyester, or the quantity of phosphorous (P) exceeds 200 ppm to the polyester, not only coloring of the polyester is intolerable, but also heat resistance and hydrolysis resistance of the polyester are remarkably lowered. In view of this, the mass ratio (P/M) of the total quantity of the phosphorous (P) to the total quantity of the metallic ions (M) is preferably in the range from 0.4 to 1.0 to secure sufficient heat resistance and hydrolysis resistance. If the mass ratio (P/M) is lower than 0.4 or higher than 1.0, drawbacks such as coloring of the film, and mixing of coarse particles may occur.

The timing of adding the metallic ions, phosphoric acids, and derivatives thereof is not specifically limited. However, it is preferred to add the metallic ions at the time of charging the raw material, namely, before trans-esterification or esterification, and to add the phosphoric acids before poly-condensation.

Further, fine particles such as silica, titanium dioxide, kaolin, and calcium carbonate may be added to the film material, according to needs. An antioxidant, a UV absorbent, an antistatic agent, a colorant, an antibacterial agent, or a like component may be added according to needs.

Polyester film can be obtained by the below-mentioned known method. There are proposed two techniques of causing the heat-shrinkable polyester film to contain plural components: one is a technique in which copolymerization is carried out, and the obtained copolyester is used singly; and the other is a technique in which homopolyesters of different kinds are blended with each other, or copolyester is blended with homopolyester or copolyester of different kind.

In the technique of using copolyester singly, the copolyester which obtained with use of the polyhydric alcohol component having the above specific composition, terephthalic acid, and other dicarboxylic acid component is used. In the technique of blending polyesters having different compositions with each other, the property of the film can be easily altered by merely changing the blending ratio of the polyesters. Use of the latter technique is preferred because the latter technique can be applied to industrial production of a variety of kinds of films.

Specifically, it is preferred to blend two or more different kinds of polyesters having a difference in glass transient (Tg), as the blending technique. For instance, in case of blending two different kinds of polyesters, copolyester from a dicarboxylic acid component containing terephthalic acid as an essential component, ethylene glycol, and neopentyl glycol may be blended with copolyester from terephthalic acid, as the dicarboxylic acid component, ethylene glycol and 1,4-cyclohexane dimethanol, as the polyhydric alcohol components; polyethylene terephthalate (PET) may be blended with copolyester from terephthalic acid, as the dicarboxyilc acid component, ethylene glycol, neopentyl glycol, and 1,4-cyclohexane dimethanol, as the polyhydric alcohol components; polybutylene terephthalate (PBT) may be blended with copolyester from terephthalic acid, as the dicarboxylic acid component, ethylene glycol, neopentyl glycol, and 1,4-cyclohexane dimethanol, as the polyhydric alcohol components. It is needless to say that the polyhydric alcohol other than the above may be added, or that a dicarboxylic acid other than terephthalic acid may be added.

Examples of blending three different kinds of polyesters are as follows. Copolyester from terephthalic acid, as the dicarboxylic acid component, ethylene glycol, neopentyl glycol, and 1,4-cyclohexane dimethanol, as the polyhydric alcohol components may be blended with PET, and PBT; copolyester from terephthalic acid, as the dicarboxylic acid component, ethylene glycol, and neopentyl glycol, as the polyhydric alcohol components may be blended with polyester from terephthalic acid, as the dicarboxylic acid component, and 1,4-cyclohexane dimethanol, as the polyhydric alcohol component, and with PET; and copolyester from terephthalic acid, as the dicarboxylic acid component, ethylene glycol and neopentyl glycol, as the polyhydric alcohol components may be blended with polyester from terephthalic acid, as the dicarboxylic acid component, and 1,4-cyclohexane dimethanol, as the polyhydric alcohol, and with PBT. It is needless to say that a polyhydric alcohol other than the above may be added or that a dicarboxylic acid other than terephthalic acid may be added. Also, four or more different kinds of polyesters may be blended with each other.

Drawbacks such as whitening of a film resulting from poor miscibility do not occur even if homopolyesters of different compositions or homopolyester and copolyester are blended with each other. This is because trans-esterification is proceeded between the homopolyesters of different compositions or between the homopolyester and the copolyester under a heated state of the raw material polyesters during a melting/kneading step in an extruder, which will be described later, and it is highly likely that the mixture may be turned into a copolyester mixture having substantially the same composition. Such a transition can be confirmed because there is observed only a single peak with respect to the Tg of the film.

A specific method for producing the inventive film comprises steps of drying raw material polyester chips with use of a dryer such as a hopper dryer or a paddle dryer, or a vacuum dryer, and extruding the chips into a film-like molten polyester with use of an extruder in a temperature ranging from 200 to 300° C., or comprises a step of extruding un-dried raw material polyester chips into a film-like molten polyester while removing water components in a vented extruder. A known technique such as extrusion provided with a T-die or tubular extrusion is applicable. After the extrusion, the film-like molten polyester is rapidly cooled to thereby obtain an undrawn film. The "undrawn film" in the specification and claims embraces a film to which a tension force necessary for feeding the film has been exerted.

Next, the undrawn film is drawn. The drawing step may be carried out continuously after the undrawn film is cooled in contact with the casting roll or the like, or may be carried out after the film is cooled and temporarily wound up into a film roll.

It is practical to set the widthwise (transverse) direction of the film as the maximal shrinkage direction in the aspect of securing production efficiency. Accordingly, in the following, illustrated is an example of drawing the film, wherein the widthwise direction of the film is defined as the maximal shrinkage direction. It should be noted that the film can be drawn in the lengthwise direction of the film, wherein the lengthwise direction is set as the maximal shrinkage direction by performing a general operation such as changing the drawing direction by 90° in the following method.

It is preferable to carry out a preheating step prior to the drawing step in drawing the un-drawn film in the widthwise direction thereof with use of a tenter or an equivalent device in order to achieve uniformity in the thickness distribution of the heat-shrinkable polyester film. In the preheating step, it is preferred that heating is carried out with such a low air blowing velocity that the surface temperature of the film lies within a temperature from Tg+0° C. to Tg+60° C., so that the heat conductivity coefficient is not higher than 0.00544 J/cm²·sec·° C. (0.0013 cal/cm²·sec·° C.).

The film is drawn in the widthwise direction thereof in a temperature range from Tg–20° C. to Tg+40° C. by 2.3 to 7.3 times, preferably, 2.5 to 6.0 times, longer than the undrawn film. After the drawing step, the drawn film is subjected to heat treatment in a temperature ranging from 50° C. to 110° C. while drawing the film by 0 to 15% or relaxing the film by 0 to 15%, and to further heat treatment in a temperature ranging from 40° C. to 100° C. according to needs, whereby the heat-shrinkable polyester film is obtained.

In the step of drawing the film in the widthwise direction thereof, it is preferable to use a facility capable of minimizing a variation in the film surface temperature. Specifically, there are provided many processes in the drawing step such as preheating before drawing, drawing, heat treatment after drawing, relaxation, and re-drawing. Particularly, in the preheating step, various drawing stages in the drawing step, and the heat treatment step after the drawing step, it is preferable to regulate a variation in the film surface temperature, which has been measured at an arbitrary location on the film, within the average temperature ±1° C., preferably within the average temperature ±0.5° C. The variation in the film surface temperature is set within the above range because the drawing and heat treatment steps are carried out substantially at the temperature identical to each other over the entirety of the film, and accordingly, heat shrinkage behavior becomes uniform.

A variation in the film surface temperature can be minimized by, for example, using an inverter-equipped facility capable of suppressing variation in air blowing velocity so as to control the blowing velocity of hot air for heating the film, or using a facility capable of suppressing a variation in hot air temperature with use of low-pressure steam of not higher than 500 kPa (5 kgf/cm²) as a heat source.

It is possible to draw the film in the lengthwise direction thereof by 1.0 to 4.0 times, preferably, 1.1 to 2.0 times longer than the undrawn film in addition to the widthwise drawing, in place of uni-axially drawing the film only in the widthwise direction thereof with use of the tenter. In case of performing bi-axial drawing, bi-axial drawing can be performed sequentially or simultaneously. Further, re-drawing may be performed according to needs. In the sequential bi-axial drawing, the film can be drawn in the order of lengthwise-and-widthwise directions, widthwise-and-lengthwise directions, lengthwise-widthwise-lengthwise directions, widthwise-lengthwise-widthwise directions, or in other arbitrary combined order. In case of adopting the lengthwise drawing step or the bi-axial drawing step, similar to the widthwise drawing step, it is preferred to minimize a variation in the film surface temperature in the preheating step, drawing step, or a like step.

It is preferable to set the heat conductivity coefficient in the drawing step not lower than 0.00377 J/cm²·sec·° C. (0.0009 cal/cm²·sec·° C.), preferably in the range from 0.00544 to 0.00837 J/cm²·sec·° C. (in the range from 0.0013 to 0.0020 cal/cm²·sec·° C.) in suppressing the internal exothermal action of the film accompanied by the drawing and in minimizing temperature spots appearing in the widthwise direction of the film.

The thickness of the inventive heat-shrinkable polyester film is not specifically limited. However, 10 to 200 μm is preferable, and 20 to 100 μm is more preferable as the thickness of the inventive film for labels.

EXAMPLES

In the following, the present invention is described in detail with Examples, which, however, do not limit the present invention. Adequate modification is allowable as far as it does not depart from the object of the present invention described above or below, and every such modification is intended to be embraced in the technical scope of the present invention. The measuring methods of the properties of films obtained by Examples and Comparative Examples are as follows.

(1) Heat Shrinkage Factor

The film was cut into square samples each in a size of 10 cm×10 cm. The square samples were immersed in hot water of 85° C.±0.5° C. for 10 seconds under no load for heat shrinkage, and then in water of 25° C.±0.5° C. for 10 seconds under no load. Thereafter, the heat shrinkage factor of the film was calculated based on the following equation by measuring the sizes of each square sample in lengthwise and widthwise directions:

Heat shrinkage factor (%)=100×(length before shrinkage−length after shrinkage)÷(length before shrinkage).

The direction along which shrinkage of a sample is largest is defined as the maximal shrinkage direction.

(2) Tear Resistance (Rupture Ratio)

A tensile test was performed in a direction orthogonal to the maximal shrinkage direction of the film before heat shrinkage according to JIS K 7127. The test was carried out under the conditions: the number of test pieces of 20, each test piece having 200 mm in length, a distance between corresponding chucks of 100 mm, each test piece having 15 mm in width, a temperature of 23° C., and a drawing rate of 200 mm/min. The number of test pieces which were torn before the drawing by 5% or less was counted, and the percentage (%) of the torn test pieces relative to all the test pieces (20 pieces) was calculated as a rupture ratio (unit: %).

(3) Film Composition

A sample solution was prepared by dissolving a film in a solvent containing chloroform D (product of Euriso-top) and trifluoroacetic acid D1 (product of Euriso-top) at a ratio of 10:1 (mass ratio), and proton NMR of the resulting sample solution was measured by NMR ("GEMINI-200", product of Varian) under a condition of a temperature of 23° C. and of an integration number of 64. In the NMR measurements, peak intensities of predetermined methylene protons were calculated, and the composition ratio of the components constituting the film was calculated based on the peak intensities.

(4) Solvent Adhesiveness

The film wound around a paper core was let stand for 250 hours in an apparatus which has been kept at ambient temperature of 30±1° C. with relative humidity of 85±2%. Thereafter, the film roll was taken out from the apparatus, and printed with 3-colors of grass green, gold, and white (manufactured by Toyo Ink Mfg. Co., Ltd.). Then, the printed film was formed into a tubular shape by adhering one end of the film to the other end thereof with a mixed solvent of 1,3-dioxolane and acetone in a mixing ratio of 80:20 (mass ratio), by a center seal automatic bag making machine, followed by flattening into a double-folded sheet and winding up into a roll. The roll was let stand for 24 hours in the apparatus which has been kept at ambient temperature of 23±1° C. with relative humidity of 65±2%. Thereafter, the roll was taken out from the apparatus and rewound for examining the adhesiveness of the film. The film having an adhesive part that easily comes unstuck by hand was evaluated as ×; the film having an adhesive part that is likely to come unstuck when a small external force is exerted by hand was evaluated as Δ; and the film having no adhesive part that easily comes unstuck by a hand was evaluated as ○. The film with the evaluation ○ was determined as PASSED.

(5) Shrinkage Finishing

The tubular film produced for the evaluation of the solvent adhesiveness was cut into heat-shrinkable polyester film labels. The film part which was not formed into the tubular films due to failure of the solvent adhesion was made into film labels by heat seal. After attaching the labels on respective glass bottles of 300 ml in capacity, the bottles attached with the labels were passed through a hot-air tunnel of air temperature at 160° C. and blowing velocity at 10 m/sec. for 13 seconds for heat shrinkage of the labels. Judgment as to whitening, and shrinkage shading was made visually, and the shrinkage finishing was evaluated based on 5 scales. The scale 5 indicates excellent finishing, the scale 4 indicates good finishing, the scale 3 indicates that a few defects such as whitening or shrinkage shading are observed (two or less sites), the scale 2 indicates that several defects such as whitening or shrinkage shading are observed (3 to 5 sites), and the scale 1 indicates quite a few defects such as whitening or shrinkage shading are observed (six or more sites). The label evaluated as the scale 4 or 5 was determined as PASSED, and the label evaluated as the scale 3, 2 or 1 was determined as FAILED.

Synthesis Example 1 (Synthesis of Polyester)

To a stainless steel autoclave equipped with a stirrer, a thermometer, and a partial reflux condenser, charged were 100% by mole of dimethyl terephthalate (DMT) as a dicarboxylic acid component, 100% by mole of ethylene glycol (EG) as a polyhydric alcohol component, so that the content of the polyhydric alcohol component was 2.2 times as much as the content of methyl ester in molar ratio, followed by addition of 0.05% by mole of zinc acetate (to the content of the acid components) as a trans-esterification catalyst, and 0.025% by mole of antimony trioxide (to the content of the acid components) as a polycondensation catalyst. Trans-esterification was conducted with distilling off of the methanol generated during the reaction. Thereafter, polycondensation was carried out under depressurization of 26.7 Pa at 280° C., thereby yielding polyester A having an intrinsic viscosity of 0.70 dl/g.

Synthesis Examples 2, 3, and 4

Polyesters B, C, and D as shown in Table 1 were synthesized by conducting a process similar to the process in Synthesis Example 1. In Table 1, NPG represents neopentyl glycol, CHDM represents 1,4-cyclohexane dimethanol, and BD represents 1,4-butanediol. The respective intrinsic viscosities of the polyesters B, C, and D were such that: 0.72 dl/g with respect to the polyester B; 0.80 dl/g with respect to the polyester C; and 1.15 dl/g with respect to the polyester D. Each of the polyesters B, C, and D were turned into chips, according to needs.

TABLE 1

| | Composition of raw material of polyester (mole %) | | | | | | | | | |
|---|---|---|---|---|---|---|---|---|---|---|
| | Dicarboxylic acid component | Polyhydric alcohol component | | | | Film composition (mass %) | | | | |
| | DMT | EG | NPG | CHDM | BD | Ex. 1 | Ex. 2 | C. Ex. 1 | C. Ex. 2 | C. Ex. 3 | C. Ex. 4 |
| Chip A | 100 | 100 | — | — | — | 4 | 20 | 37 | 33 | 55 | 35 |
| Chip B | 100 | 70 | 30 | — | — | 24 | 8 | 58 | — | 8 | 8 |
| Chip C | 100 | 65 | — | 35 | — | 56 | 56 | — | 62 | 27 | 27 |
| Chip D | 100 | — | — | — | 100 | 16 | 16 | 5 | 5 | 10 | 30 |

Example 1

The respective chips obtained in the above Synthesis Examples were individually pre-dried. As shown in Table 1, the pre-dried chips A, B, C, and D respectively in the amounts of 4 mass %, 24 mass %, 56 mass %, and 16 mass % were mixed together, and the mixture was molten and extruded by the uni-axial extruder at 280° C., followed by rapid cooling to yield an un-drawn film of 180 μm in thickness. The un-drawn film was preheated at 77° C. for 12 seconds, and drawn in the widthwise direction at 71° C. 4.0 times longer than the un-drawn film with use of the tenter. Next, heat-treatment was performed at 81° C. for 10 seconds. Thus, obtained was a heat-shrinkable polyester film having a thickness of 45 μm. The physical properties of the obtained film are shown in Table 2.

Example 2

The respective chips obtained in the above Synthesis Examples were individually pre-dried. As shown in Table 1, the pre-dried chips A, B, C, and D respectively in the amounts of 20 mass %, 8 mass %, 56 mass %, and 16 mass % were mixed together, and the mixture was molten and extruded by the uni-axial extruder at 280° C., followed by rapid cooling to yield an un-drawn film of 180 μm in thickness. The un-drawn film was preheated at 78° C. for 12 seconds, and drawn in the widthwise direction at 71° C. 4.0 times longer than the un-drawn film with use of the tenter. Next, heat-treatment was performed at 80° C. for 10 seconds. Thus, obtained was a heat-shrinkable polyester film having a thickness of 45 μm. The physical properties of the obtained film are shown in Table 2.

Comparative Example 1

The respective chips obtained in the above Synthesis Examples were individually pre-dried. As shown in Table 1, the pre-dried chips A, B, and D respectively in the amounts of 37 mass %, 58 mass %, and 5 mass % were mixed together, and the mixture was molten and extruded by the uni-axial extruder at 280° C., followed by rapid cooling to yield an un-drawn film of 180 μm in thickness. The un-drawn film was preheated at 77° C. for 12 seconds, and drawn in the widthwise direction at 71° C. 4.0 times longer than the un-drawn film with use of the tenter. Next, heat-treatment was performed at 80° C. for 10 seconds. Thus, obtained was a heat-shrinkable polyester film having a thickness of 45μm. The physical properties of the obtained film are shown in Table 2.

Comparative Example 2

The respective chips obtained in the above Synthesis Examples were individually pre-dried. As shown in Table 1, the pre-dried chips A, C, and D respectively in the amounts of 33 mass %, 62 mass %, and 5 mass % were mixed together, and the mixture was molten and extruded by the uni-axial extruder at 280° C., followed by rapid cooling to yield an un-drawn film of 180 μm in thickness. The un-drawn film was preheated at 78° C. for 12 seconds, and drawn in the widthwise direction at 71° C. 4.0 times longer than the un-drawn film with use of the tenter. Next, heat-treatment was performed at 81° C. for 10 seconds. Thus, obtained was a heat-shrinkable polyester film having a thickness of 45 μm. The physical properties of the obtained film are shown in Table 2.

Comparative Example 3

The respective chips obtained in the above Synthesis Examples were individually pre-dried. As shown in Table 1, the pre-dried chips A, B, C, and D respectively in the amounts of 55 mass %, 8 mass %, 27 mass %, and 10 mass % were mixed together, and the mixture was molten and extruded by the uni-axial extruder at 280° C., followed by rapid cooling to yield an un-drawn film of 180 μm in thickness. The un-drawn film was preheated at 83° C. for 12 seconds, and drawn in the widthwise direction at 71° C. 4.0 times longer than the un-drawn film with use of the tenter. Next, heat-treatment was performed at 70° C. for 10 seconds. Thus, obtained was a heat-shrinkable polyester film having a thickness of 45 μm. The physical properties of the obtained film are shown in Table 2.

Comparative Example 4

The respective chips obtained in the above Synthesis Examples were individually pre-dried. As shown in Table 1, the pre-dried chips A, B, C, and D respectively in the amounts of 35 mass %, 8 mass %, 27 mass %, and 30 mass % were mixed together, and the mixture was molten and extruded by the uni-axial extruder at 280° C., followed by rapid cooling to yield an un-drawn film of 180 μm in thickness. The un-drawn film was preheated at 83° C. for 12 seconds, and drawn in the widthwise direction at 71° C. 4.0 times longer than the un-drawn film with use of the tenter. Next, heat-treatment was performed at 70° C. for 10 seconds. Thus, obtained was a heat-shrinkable polyester film having a thickness of 45 μm. The physical properties of the obtained film are shown in Table 2.

TABLE 2

| | Film composition (mole %) | | | | | | Heat shrinkage factor (%) | Rupture ratio (%) | Solvent adhesiveness | Shrinkage finishing |
|---|---|---|---|---|---|---|---|---|---|---|
| | Dicarboxylic acid component Terephthalic acid | Polyhydric alcohol component | | | | | | | | |
| | | EG | NPG | CHDM | BD | DEG | | | | |
| Ex. 1 | 100 | 56.5 | 7.8 | 18.6 | 15.2 | 1.9 | 57.0 | 0 | ○ | 5 |
| Ex. 2 | 100 | 61.6 | 2.6 | 18.5 | 15.2 | 2.1 | 53.0 | 0 | ○ | 5 |
| C. Ex. 1 | 100 | 75.8 | 17.5 | 0 | 4.7 | 2.0 | 55.0 | 0 | Δ | 2 |
| C. Ex. 2 | 100 | 72.7 | 0 | 20.7 | 4.8 | 1.8 | 51.5 | 0 | ○ | 2 |
| C. Ex. 3 | 100 | 76.8 | 2.6 | 9.0 | 9.5 | 2.1 | 50.8 | 0 | x | 1 |
| C. Ex. 4 | 100 | 57.9 | 2.6 | 9.0 | 28.6 | 1.9 | 50.0 | 30 | x | 1 |

INDUSTRIAL APPLICABILITY

The inventive heat-shrinkable polyester film is advantageous because the film has no or less defects such as whitening, shrinkage shading, crinkling, distortion, or uneven shrinkage in a direction orthogonal to the maximum shrinkage direction of the film, and provides satisfactory finishing appearance after shrinkage. Further, the inventive film has excellent tear resistance and solvent adhesiveness. Thus, the inventive film is suitable for a variety of kinds of film products such as shrinkable labels, cap seals, and shrinkable packages.

The invention claimed is:

1. A heat-shrinkable polyester film made of a polyester comprising as raw materials 1,4-cyclohexane dimethanol of not less than 10% by mole, neopentyl glycol of not less than 2% by mole, based on a polyhydric alcohol component constituting the polyester, the sum of the contents of the 1,4-cyclohexane dimethanol and the neopentyl glycol being in the range from 12 to 40% by mole, a dicarboxylic acid component constituting the polyester being an aromatic dicarboxylic acid other than isophtalic acid, and the content of ethylene terephthalate units being not less than 50% by mole, the film being substantially free of voids, wherein
a heat shrinkage factor of a 10 cm square sample of the film in a maximal shrinkage direction of the film is not less than 20% under the condition that the sample is immersed in hot water of 85° C. for 10 seconds, and then in water of 25° C. for 10 seconds; and the number of test pieces of the film having an elongation at break of not more than more than 5% is not more than 10% to the total number of the test pieces under the condition that a tensile test of drawing the film in a direction orthogonal to the maximal shrinkage direction of the film is conducted with a distance between corresponding chucks of 100 mm, each test piece having 15 mm in width, a temperature of 23° C., and a drawing rate of 200 mm/min.

2. The film according to claim 1, wherein the aromatic dicarboxylic acid is terephthalic acid.

3. The film according to claim 2, wherein the polyhydric alcohol component contains 1,4-butanediol of not less than 2% by mole.

4. The film according to claim 1, wherein the polyhydric alcohol component contains 1,4-butanediol of not less than 2% by mole.

* * * * *